United States Patent [19]

Vanmaele et al.

[11] Patent Number: 5,084,435
[45] Date of Patent: Jan. 28, 1992

[54] DYE-DONOR ELEMENT FOR USE IN THERMAL DYE SUBLIMATION TRANSFER

[75] Inventors: Luc J. Vanmaele, Lochristi; Wilhelmus Janssens, Aarschot, both of Belgium

[73] Assignee: AGFA-Gevaert, N.W., Mortsel, Belgium

[21] Appl. No.: 623,580

[22] Filed: Dec. 7, 1990

[30] Foreign Application Priority Data

Dec. 12, 1989 [EP] European Pat. Off. .......... 89203157

[51] Int. Cl.$^5$ ...................... B41M 5/035; B41M 5/26
[52] U.S. Cl. ........................................ 503/227; 8/471; 428/195; 428/480; 428/483; 428/500; 428/522; 428/913; 428/914
[58] Field of Search ................... 8/471; 428/195, 480, 428/483, 913, 914, 500, 522

[56] References Cited

FOREIGN PATENT DOCUMENTS 60-180889 9/1985 Japan .................................. 503/227

Primary Examiner—Bruce H. Hess
Attorney, Agent, or Firm—Breiner & Breiner

[57] ABSTRACT

Dye-donor element for use according to thermal dye sublimation transfer comprising a support having thereon a dye layer containing a duplo-arylazoaniline dye incorporating two or more arylazoaniline chromophore units which are linked to each other by means of chemical bonds or linking groups.

5 Claims, No Drawings

DYE-DONOR ELEMENT FOR USE IN THERMAL DYE SUBLIMATION TRANSFER

DESCRIPTION

The present invention relates to novel duplo-arylazoaniline dyes for use according to thermal dye sublimation transfer.

Thermal dye sublimation transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

A dye-donor element for use according to thermal dye sublimation transfer usually comprises a very thin support e.g. a polyester support, which may be coated on one or both sides with an adhesive or subbing layer, one adhesive or subbing layer being covered with a slipping layer that provides a lubricated surface against which the thermal printing head can pass without suffering abrasion, the other adhesive layer at the opposite side of the support being covered with a dye layer, which contains the printing dyes.

The dye layer can be a monochrome dye layer or it may comprise sequential repeating areas of different dyes like e.g. cyan, magenta and yellow dyes. Besides areas containing these three primary color dyes, an area containing a black dye, mostly in the form of a mixture of several dyes, can be provided. When a dye-donor element containing three or more dyes is used, a multicolor image can be obtained by sequentially performing the dye transfer process steps for each color.

Any dye can be used in such a dye layer provided it is easily transferable to the dye-image-receiving layer of the receiver sheet by the action of heat.

Typical and specific examples of dyes for use in thermal dye sublimation transfer have been described in, e.g., EP 209990, EP 209991, EP 216483, EP 218397, EP 227095, EP 227096, EP 229374, EP 235939, EP 247737, EP 257577, EP 257580, EP 258856, EP 279330, EP 279467, EP 285665, U.S. Pat. No. 4,743,582, U.S. Pat. No. 4,753,922, U.S. Pat. No. 4,753,923, U.S. Pat. No. 4,757,046, U.S. Pat. No. 4,769,360, U.S. Pat. No. 4,771,035, JP 84/78894, JP 84/78895, JP 84/78896, JP 84/227490, JP 84/227948, JP 85/27594, JP 85/30391, JP 85/229787, JP 85/229789, JP 85/229790, JP 85/229791, JP 85/229792, JP 85/229793, JP 85/229795, JP 86/41596, JP 86/268493, JP 86/268494, JP 86/268495 and JP 86/284489.

Arylazoaniline dyes have been described for use in thermal dye sublimation transfer in EP 218397. These arylazoaniline dyes have the important drawback of retro-sublimation, i.e. after the dye has been transferred to the receiving sheet, part of the dye re-sublimates in the course of time from the dye image to a sheet of paper or any other substrate in contact with the dye-receiving layer.

It is an object of the present invention to provide arylazoaniline dyes for use in thermal dye sublimation transfer with a decreased degree of retro-sublimation.

Other objects will become apparent from the description hereinafter.

In accordance with the present invention a dye-donor element for use according to thermal dye sublimation transfer is provided, said dye-donor element comprising a support having thereon a dye layer containing a duplo-arylazoaniline dye incorporating two or more arylazoaniline chromophore units which are linked to each other by means of chemical bonds or linking groups.

In particular, dyes according to the present invention can be represented by the following formula

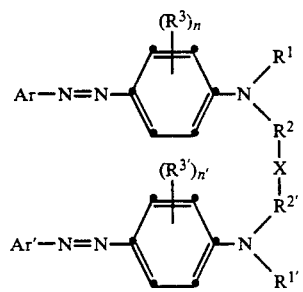

wherein:

$R^1$ represents hydrogen, a substituted or unsubstituted alkyl group, a substituted or unsubstituted cycloalkyl group, a substituted or unsubstituted aryl group, a substituted or unsubstituted allyl group, and $R^2$ represents a substituted or unsubstituted alkylene group, a substituted or unsubstituted cycloalkylene group, a substituted or unsubstituted arylene group, or $R^1$ and $R^2$ together form the necessary atoms to close a 5- or 6-membered heterocyclic with the nitrogen to which they are attached, or a 5- or 6-membered heterocyclic ring may be formed with $R^1$ and/or $R^2$, the nitrogen to which they are attached and either or both carbon atoms of the phenyl ring ortho to said nitrogen atom;

$R^3$ represents a hydroxy group, a halogen atom, a substituted or unsubstituted alkyl group, a substituted or unsubstituted cycloalkyl group, a substituted or unsubstituted aryl group, a substituted or unsubstituted alkoxy group, a substituted or unsubstituted aryloxy group, a substituted or unsubstituted carbonylamino group, a substituted or unsubstituted sulfonylamino group;

n equals 0, 1 or 2; the $R^3$ substituents may be the same or different when n is 2;

Ar represents a substituted or unsubstituted aryl group;

$R^{1'}$, $R^{2'}$, $R^{3'}$, $n'$ and $Ar'$ each can have any of the significances given to $R^1$, $R^2$, $R^3$, n and Ar respectively;

X represents a linking member which can be a chemical bond, a bivalent atom such as O, S, N, or a bivalent atom group such as $SO_2$, $SO_2NH$, NHCONH or a bivalent hydrocarbon group such as alkylene or arylene.

Examples of substituents for Ar and Ar' include halogen, nitro, nitrile, alkyl, cycloalkyl, aryl, alkoxy and aryloxy. Two or more substituents may be linked together so as to form a 5- or 6-membered ring fused-on the aromatic nucleus.

A particularly preferred substituent $R^{3()}$ is hydroxy in ortho position with respect to the azo link.

Duplo-arylazoaniline dyes according to the above formula generally have absorption maxima in the region 410–550 nm and are useful for the printing of yellow-orange shades.

In addition to a decrease in retro-sublimation, the present dyes also yield higher transfer densities than the mono-arylazoaniline dyes at the same dye coverage.

The dye layer of the dye-donor element is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed generally has a thickness of about 0.2 to 5.0 μm, preferably 0.4 to 2.0 μm, and the amount ratio of dye to binder is generally between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, copolyvinyl chloride-vinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyarylene oxide; organosilicones, such as polysiloxanes; epoxy resins and natural resins, such as gum arabic.

The coating layer may also contain other additives, such as curing agents, preservatives, etc., these and other ingredients being described more fully in EP 133011, EP 133012, EP 111004 and EP 279467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include sheets or films of polyester such as polyethylene terephthalate, polyamide, polyacrylate, polycarbonate, cellulose ester, fluorinated polymer, polyether, polyacetal, polyolefin, polyimide, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/-subbing layers.

Preferably the reverse side of the dye-donor element is coated with a slipping layer to prevent the printing head from sticking to the dye-donor element. Such a slipping layer comprises a lubricating material such as a surface active agent, a liquid lubricant, a solid lubricant or mixtures thereof, with or without a polymeric binder. The surface active agents may be any agent known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. No. 4,567,113, U.S. Pat. No. 4,572,860, U.S. Pat. No. 4,717,711.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester.

To avoid poor adsorption of the transferred dye to the support of the receiver sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. Suitable dye-receiving layers have been described in e.g. EP 133011, EP 133012, EP 144247, EP 227094, EP 228066.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished e.g. by heating for about several milliseconds at a temperature of 400° C.

When the process is performed for but one single color, a monochrome yellow dye transfer image is obtained, which consists of at least one dye according to the present invention. A multicolor image can be obtained by using a donor element containing three or more primary color dyes, one of which consists of at least one yellow dye according to the present invention, and sequentially performing the process steps described above for each color. After the first dye has been transferred, the elements are peeled apart. A second dye-donor element (or another area of the donor element with a different dye area) is then brought in register with the dye-receiving element and the process is repeated. The third color and optionally further colors are obtained in the same manner.

Instead of thermal heads, laser light, infrared flash or heated pens can be used as the heat source for supplying heat energy. Thermal printing heads that can be used to transfer dye from the dye-donor elements of the present invention to a receiver sheet are commercially available.

The following examples are provided to illustrate the invention in more detail without limiting, however, the scope thereof.

EXAMPLE 1

Synthesis of Dye I

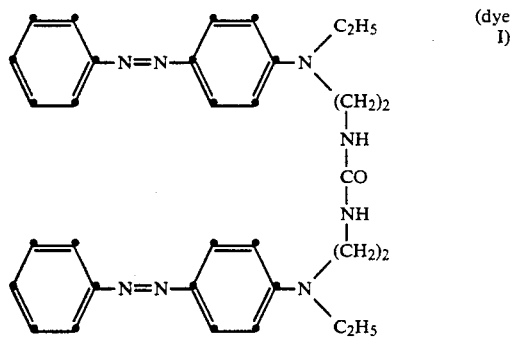
(dye I)

20 g of diphenyl carbonate together with 29.2 g of N-ethyl,N-(2-aminoethyl)aniline were melted at 120° C. 1.14 g of 4-dimethylaminopyridine was added to this mixture. After 30 minutes of stirring the mixture was cooled. The reaction mixture was recrystallized using 250 ml of ethanol, cooled to room temperature, filtered and dried. 22.9 g of N,N'-bis-(2-(N-ethyl,N-phenyl-)aminoethyl) urea was obtained (yield: 69%).

3.9 g of aniline was dissolved in 10 ml of water and 10 ml of concentrated hydrogen chloride and cooled to 5° C. A solution of 3.15 g $NaNO_2$ in 15 ml of water was added hereto dropwise while keeping the temperature between 5° and 10° C. The obtained diazonium solution was stirred for 1 hour.

7.08 g of the urea obtained in the first step was dissolved in 170 ml acetic acid. 42.5 ml of water and 85 g sodium acetate were added and the mixture was cooled to 5° C. The diazonium solution was added hereto dropwise. The obtained mixture was stirred for 1 hour at 5° C. Thereafter the reaction product was stirred in 300 ml of ethanol, refluxed for 15 minutes and filtered warm. The reaction product was washed four times with 100 ml of ethanol, six times with 100 ml of water and once with 100 ml of ethanol. The precipitate was dried at 50° C. and recrystalized using 900 ml of ethanol. 5.9 g of dye I were obtained (yield: 52%).

$\lambda_{max}$ of dye I dissolved in methanol is 412 nm and $\epsilon_{max} = 109680$.

EXAMPLE 2

Synthesis of Dye II

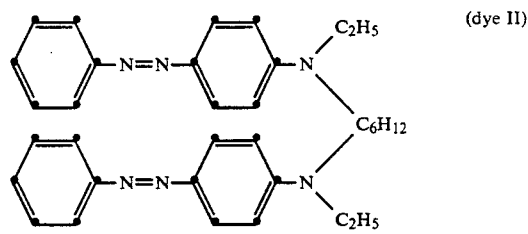
(dye II)

50.8 g of N-ethyl aniline together with 48.8 g of 1,6-dibromohexane and 25.2 g of sodium carbonate were dissolved in 500 ml of toluene. The mixture was stirred while refluxed at 115° C. Reflux was continued overnight. The precipitate was filtered and stirred in 1.25 l of ethyl acetate. The ethyl acetate phase was washed with 500 ml of water and 20 ml of acetic acid. The filtrate and the ethyl acetate phase were washed with a saturated sodium chloride solution and dried on sodium sulfate. The reaction product was isolated by concentration under reduced pressure. 45.4 g of N,N'-diethyl-N,N'-diphenyl-1,6-diaminohexane were obtained (yield: 70%).

3.17 g of aniline was dissolved in 10 ml of water and 10 ml of concentrated hydrogen chloride and cooled to 0°-5° C. A solution of 2.6 g $NaNO_2$ in 13 ml of water was added hereto dropwise while keeping the temperature between 0° and 20° C. The obtained diazonium solution was stirred for 1 hour.

5 g of the N,N'-diethyl-N,N'-diphenyl-1,6-diaminohexane was dissolved in 180 ml acetic acid. 36 ml of water and 72 g sodium acetate were added and the mixture was stirred on an ice-bath. 2.2 eq. of the diazonium solution was added hereto dropwise while keeping the temperature below 20° C. The obtained mixture was left overnight. The precipitate was filtered, dried and pulverized, washed thoroughly with water and dried. The reaction product was purified by column chromatography using as eluent hexane/dichloro methane. 3.5 g of dye II were obtained (yield: 43%).

$\lambda_{max}$ of dye II dissolved in methanol is 415 nm and $\epsilon_{max} = 56921$.

EXAMPLE 3

A dye-donor element for use according to thermal dye sublimation transfer was prepared as follows:

A solution of 50 mg of dye as identified below and 50 mg of binder (co-acrylonitrile-styreen B1 or co-polyvinyl chloride-vinyl acetate B2) in 10 ml of methylethylketone was prepared. From this solution a layer having a wet thickness of 100 μm was coated on 5 μm polyethylene terephthalate film. The resulting layer was dried by evaporation of the solvent.

A commercially available material supplied by Hitachi Ltd., type VY-S100A, was used as receiving element.

The dye-donor element was printed in combination with the receiving element in a color video printer supplied by Hitachi Ltd., type VY-100A.

The receiver sheet was separated from the dye-donor element and the maximum color density of the recorded dye image on the receiving sheet ($D_{max}$) was measured by means of a Macbeth RD919 densitometer.

The color densities of the transferred image through red ($D_r$), green ($D_g$) and blue ($D_b$) filters was measured by means of a Macbeth RD919 densitometer in status A mode.

The retro-sublimation was tested as follows: the dye layer was placed in face-to-face relationship with a plain paper. The assemblage was placed between two papers under glass plates of 20×30 cm for 20 h at 60° C., with a weight of 1 kg on top. Afterwards the density of dye transferred to the paper ($D_{retro}$) was measured.

These experiments were repeated for each of the dyes identified below.

TABLE 1

| dye | binder | $D_{max}$ | $D_r$ | $D_g$ | $D_b$ | $D_{retro}$ |
|-----|--------|-----------|-------|-------|-------|-------------|
| I   | B1     | 2.02      | 6     | 17    | 150   | 0.07        |
| II  | B2     | 2.20      | 5     | 18    | 150   | 0.07        |

Comparative experiments were carried out with the following mono-arylazoaniline dyes.

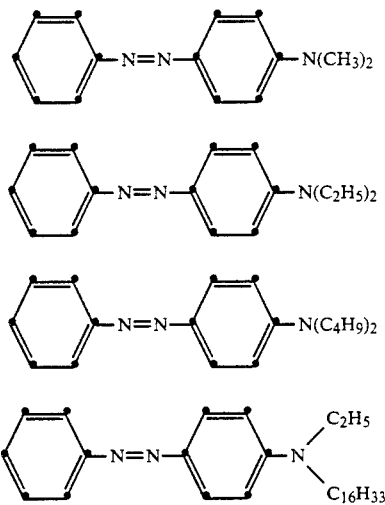

The results are listed below.

TABLE 2

| dye | binder | $D_{max}$ | $D_r$ | $D_g$ | $D_b$ | $D_{retro}$ |
|-----|--------|-----------|-------|-------|-------|-------------|
| III | B1     | 1.96      | 5     | 16    | 150   | 0.34        |
| IV  | B1     | 1.98      | 4     | 15    | 150   | 0.31        |
| V   | B1     | 2.00      | 5     | 18    | 150   | 0.31        |
| VI  | B2     | 1.59      | 5     | 18    | 150   | 0.24        |

These results show that the duplo-arylazoaniline dyes yield less retro-sublimation than the mono-arylazoanilines along with an increase in transfer density, and practically no spectral change.

We claim:

1. Dye-donor element for use according to thermal dye sublimation transfer comprising a support having thereon a dye layer containing a duplo-arylazoaniline dye which corresponds to the following formula

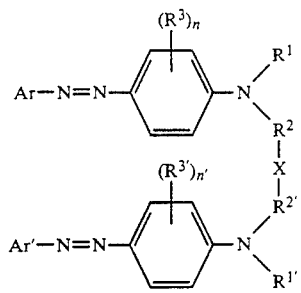

wherein:
  $R^1$ represents hydrogen, a substituted or unsubstituted alkyl group, a substituted or unsubstituted cycloalkyl group, a substituted or unsubstituted aryl group, a substituted or unsubstituted allyl group, and $R^2$ represents a substituted or unsubstituted alkylene group, a substituted or unsubstituted cycloalkylene group, a substituted or unsubstituted arlyene group, or $R^1$ and $R^2$ together form the necessary atoms to close a 5- or 6-membered heterocyclic ring with the nitrogen to which they are attached, or a 5- or 6-membered heterocyclic ring may be formed with $R^1$ and/or $R^2$, the nitrogen to which they are attached and either or both carbon atoms of the phenyl ring ortho to said nitrogen atom;
  $R^3$ represents a hydroxy group, a halogen atom, a substituted or unsubstituted alkyl group, a substituted or unsubstituted cycloalkyl group, a substituted or unsubstituted aryl group, a substituted or unsubstituted alkoxy group, a substituted or unsubstituted aryloxy group, a substituted or unsubstituted carbonylamino group, a substituted or unsubstituted sulfonylamino group;
  n equals 0, 1 or 2; the $R^3$ substituents may be the same or different when n is 2;
  Ar represents a substituted or unsubstituted aryl group;
  $R^{1'}$, $R^{2'}$, $R^{3'}$, $n'$ and $Ar'$ each can have any of the significances given to $R^1$, $R^2$, $R^3$, n and Ar respectively;
  X represents a linking member which can be a chemical bond, a bivalent atom, a bivalent atom group or a bivalent hydrocarbon group.

2. Dye-donor element according to claim 1, wherein $R^1$, $R^2$, $R^{1'}$ and $R^{2'}$ each represent an alkyl group (same or different), n and n' each equal 0, Ar and Ar' each represent phenyl and X represents NHCONH or an alkylene group.

3. Dye-donor element according to claim 1, wherein the absorption of the duplo-arylazoaniline dye lies in the range of 410 to 550 nm.

4. Dye-donor element according to claim 1, wherein the dye layer comprises a binder selected from the group consisting of co-acrylonitrile-styrene and co-polyvinyl chloride-vinyl acetate.

5. Dye-donor element according to claim 1, wherein the support consists of polyethylene terephthalate.

* * * * *